Patented July 31, 1934

1,968,441

UNITED STATES PATENT OFFICE 1,968,441

PROCESS OF PREPARING LACQUERS, VARNISHES, OR THE LIKE

Ernst Elbel and Fritz Seebach, Erkner, near Berlin, Germany, assignors to Bakelite Gesellschaft mit beschränkter Haftung, Berlin, Germany No Drawing. Application January 22, 1930, Serial No. 422,683. In Germany January 29, 1929

4 Claims. (Cl. 134—26)

According to our prior U. S. application Ser. No. 295,344 filed July 25, 1928, lacquers or varnishes can be prepared from resitoles, that is, synthetic resinous products of a hardenable nature which are in an intermediate or B state wherein they are not fusible or soluble but swell in the usual solvents. According to that disclosure lacquers or varnishes are obtained by dissolving resitoles in suitable solvents, either alone or with the addition of other resins, under normal atmospheric, reduced or increased pressure and at ordinary or elevated temperatures. It has now been found upon further investigation that lacquers and varnishes consisting of resitole solutions are obtained more readily and more advantageously in comparison with the process disclosed in the aforesaid prior application, according to which the resitoles are first prepared and then brought into solution, by causing the formation of the resitoles in the presence of a greater or less amount of substances that are suitable as solvents. While the solvents mentioned in the prior application are remarkably good solvents for resitoles, their solution therein, however, requires care in avoiding overheating the solutions to thereby cause a partial conversion of the resitoles into resites—that is, the final infusible and practically insoluble or C products—and consequent precipitation of the resins. According to the process of the present invention not only are the lacquers and varnishes prepared from resoles or hardenable synthetic resins in an initial fusible and soluble or A condition in one operation but the danger of precipitation through overheating is overcome.

In accordance with this invention resoles are dissolved in suitable amounts of a solvent or solvents and converted to the resitole form by heating the solution. The greater the amount of solvent used the less is the danger of overheating the resitoles through contact with parts of the apparatus that are overheated to cause formation of insoluble products. For example, the entire amount of solvent to be used can be added to a resole, as described in the prior application in connection with resitoles, to yield directly resitole lacquers upon sufficient heating. The technical procedure however is subject to wide variation; the various methods described in the prior application are adaptable to the present case. Thus a resole can be dissolved in a greater amount of solvent than that required for a varnish and the excess solvent can be removed from the final resitole solution by distillation. Or a resole can be dissolved in an amount of solvent desired in the finished lacquer and converted into a resitole, and any water remaining as a result of the conversion that has not been eliminated during the course of heating the resole solution can be removed by distillation under normal pressure or a partial vacuum. The elimination of the water of reaction is very important for otherwise the varnishes are likely to exhibit cloudiness and troublesome precipitations. It is also possible to proceed as, for instance, by interrupting the heating, so that a part only of the resole is converted into a resitole.

It is not essential to begin with resoles. Resitole solutions can be obtained from non-hardenable condensation or reaction products, the so-called novolaks, by dissolving them together with hardening agents, such as aldehydes or their polymers, aldehyde-liberating substances as hexamethylenetetramine, basically acting substances as oxides or hydroxides, or other suitable metal compounds in appropriate solvents and then beginning heating.

Resole solutions can be heated in the usual manner under reduced or increased pressure and other natural or synthetic, hardenable or non-hardenable resins can be added to a solution before, during or after the heating period. As solvents there can, for example, be used hydrogenated phenols, cyclic ketones or the homologs of these bodies, besides furfural. Organic liquids which have no solvent power as tetralin or homobenzol can be employed in admixture with these solvents. Furthermore one can proceed by adding to the solution catalyzers, as nitrophenols, which accelerate the hardening of the lacquer film. Finally plasticizers and fireproofing compounds can be included. Suitable plasticizers, besides the triamylphosphates mentioned in the prior application, are oils, chlorinated or hydrogenated naphthalenes, etc.

One can for example proceed as follows:

1. 50 kilos resole are dissolved in 25 kilos cyclohexanol and heated until the at first thinly liquid substance starts to solidify; then 50 kilos cyclohexanol are added and heated until solution is completed. The solution is then poured into wood alcohol to obtain a thin lacquer.

2. 30 parts by weight of resole are dissolved in 20 parts by weight of cyclohexanol and are heated at about 110° C. until the resole in the solution is completely converted into resitole. This is recognized by the fact that, after approximately ½ to 1½ hours heating a lively gas formation sets in accompanied by more or less violent foaming. The gases and foaming are caused by the water forming during the conversion of the resoles into resitoles, which does not mix with cyclohexanol. The removal of the water may be completed by heating under a partial vacuum or with substances acting as dehydrating agents, such as calcium chloride.

3. 27 parts by weight of novolak and 2.7 parts by weight of hexamethylenetetramine are dissolved in 20 parts by weight of cyclohexanol, and the procedure is followed as in Example 2.

The resitole solutions obtained according to Examples 2 and 3 may likewise be mixed with wood alcohol or other varnish solvents.

The following definitions are intended for the terms "resole", "resitole", "resite" and "novolak". A resole is a resin of the type hardenable by heat to a final infusible insoluble condition but reacted only to the stage where it still melts when heated and is soluble in acetone; this is also known as the A-stage or A condition and the resin at this stage is known as an A-type resin. A resitole is a resin of the same type as a resole but further reacted to a B state or B type where it has become infusible, i. e., it does not melt although it softens somewhat upon heating and it is insoluble but swells in acetone. A resite is the same heat-hardenable resin but reacted to the final or C stage or C product, characterized by complete insolubility in acetone and infusible without any material softening upon heating. A novolak is a distinctly different type of resinous reaction product in that practically speaking it does not harden upon heating to an insoluble infusible condition but remains soluble and fusible. The resins here defined are those made from the phenols or their derivatives with a methylene or aldehyde agent as is well understood by those skilled in the art.

We claim:

1. A process of making lacquers and varnishes containing hardenable phenol-formaldehyde resins which comprises dissolving a phenol-formaldehyde resin in the resole stage at which it still melts when heated and is soluble in alcohol in a solvent of the group consisting of hydrogenated aromatic hydrocarbons, hexahydrogenated phenols and their esters and hydroaromatic cyclic ketones, heating the solution at converting temperature until a conversion of phenol-formaldehyde resin of the resole stage into a phenol-formaldehyde resin of the resitole stage takes place, which resitole is thermoplastic but infusible and is insoluble in alcohol but swells therein, and adding liquids if necessary to maintain the product fluid.

2. Process of making lacquers and varnishes containing hardenable phenol-formaldehyde resins which comprises dissolving a permanently soluble and fusible phenol-formaldehyde resin together with a hardening agent in a solvent of the group consisting of hydrogenated aromatic hydrocarbons, hexahydrogenated phenols and their esters and hydroaromatic cyclic ketones, heating the solution at converting temperature until a conversion of fusible resin into a phenol-formaldehyde resin which is thermoplastic but infusible and which is insoluble in alcohol but swells therein takes place, and adding liquids if necessary to maintain the product fluid.

3. A process according to claim 1, characterized therein that organic liquids which do not dissolve phenol-formaldehyde resin of the said resitole stage are used in conjunction with said solvent.

4. As a composition of matter a solution of a phenol-formaldehyde resin in an organic solvent of the group consisting of hydrogenated aromatic hydrocarbons, hexahydrogenated phenols and their esters and hydro-aromatic cyclic ketones, which composition is prepared by dissolving in said organic solvent a preformed phenol-formaldehyde resin which has been reacted to a stage at which it is thermoplastic and fusible and at which it is soluble in alcohol, and converting said resin to a stage of resinification at which it is thermoplastic but infusible and at which it is insoluble in alcohol but swells therein by heating the so-prepared solution at converting temperature until said conversion has been effected.

ERNST ELBEL.
FRITZ SEEBACH.